US009420405B2

(12) United States Patent
Ahmed et al.

(10) Patent No.: US 9,420,405 B2
(45) Date of Patent: Aug. 16, 2016

(54) REMOTELY CONTROLLING A VEHICLE TELEMATICS UNIT (71) Applicants: General Motors LLC, Detroit, MI (US); GM Global Technology Operations LLC, Detroit, MI (US)

(72) Inventors: Wahaj Ahmed, Dearborn, MI (US); Huong T. Chim, Troy, MI (US); Steven S. Sauerbrey, Farmington Hills, MI (US); Kier M. Mathieson, Grosse Pointe Farms, MI (US)

(73) Assignee: General Motors LLC, Detroit, MI (US)

( * ) Notice: Subject to any disclaimer, the term of this patent is extended or adjusted under 35 U.S.C. 154(b) by 135 days.

(21) Appl. No.: 14/079,283

(22) Filed: Nov. 13, 2013

(65) Prior Publication Data

US 2015/0133108 A1    May 14, 2015

(51) Int. Cl.
*H04W 4/00*      (2009.01)
*H04W 84/12*     (2009.01)

(52) U.S. Cl.
CPC .............. *H04W 4/008* (2013.01); *H04W 84/12* (2013.01)

(58) Field of Classification Search
CPC   H04M 1/72533;  H04M 1/7253;  H04W 88/02
USPC ........................................................ 455/420
See application file for complete search history.

(56) References Cited

U.S. PATENT DOCUMENTS

| | | | |
|---|---|---|---|
| 2006/0293813 A1* | 12/2006 | Nou ................................. 701/33 |
| 2007/0249323 A1* | 10/2007 | Lee ......................... G06F 21/33 455/411 |
| 2009/0195370 A1* | 8/2009 | Huffman et al. .......... 340/426.13 |
| 2011/0195699 A1* | 8/2011 | Tadayon .............. H04B 5/0062 455/418 |
| 2012/0071140 A1* | 3/2012 | Oesterling et al. .......... 455/414.1 |
| 2012/0094657 A1* | 4/2012 | Gullapalli et al. ............. 455/425 |
| 2012/0142367 A1* | 6/2012 | Przybylski .................. 455/456.1 |
| 2012/0204243 A1* | 8/2012 | Wynn ....................... H04L 63/08 726/5 |
| 2013/0055096 A1* | 2/2013 | Kim ........................ B60K 35/00 715/738 |
| 2013/0274997 A1* | 10/2013 | Chien ...................... G06F 17/00 701/36 |
| 2013/0304281 A1* | 11/2013 | Burcham ................. G06F 21/10 701/2 |
| 2014/0164559 A1* | 6/2014 | Demeniuk ............. H04B 1/082 709/217 |

* cited by examiner

*Primary Examiner* — Qun Shen
(74) *Attorney, Agent, or Firm* — Christopher DeVries; Reising Ethington P.C.

(57) ABSTRACT

A method and a system for providing control of a vehicle telematics unit using a mobile device. The method carried out by the system includes the steps of: determining a mobile device is configured to control a vehicle telematics unit; receiving at a call center a vehicle telematics unit (VTU) command from the mobile device instructing the telematics unit to provide vehicle data using short range wireless communication (SRWC); sending the VTU command from the call center to the telematics unit; and transmitting via SRWC the vehicle data.

14 Claims, 3 Drawing Sheets

Figure 1

REMOTELY CONTROLLING A VEHICLE TELEMATICS UNIT

TECHNICAL FIELD

The present invention relates to vehicle telematics units and functionality interconnecting mobile devices with vehicle telematics units.

BACKGROUND

Individuals are increasingly desiring greater access to entertainment data and applications without consuming the cellular data of their own wireless plans. Thus, Wi-Fi hotspots have become increasingly popular. A Wi-Fi hotspot provides a wireless local area network that enables internet access to devices connected to the network. Today, such hotspots are available in coffee shops, restaurants, libraries, etc.

Joining a Wi-Fi network may or may not require network password. For example, when an individual wishes to access the internet using Wi-Fi, the individual may have to first provide the network its preconfigured password.

SUMMARY

According to an embodiment of the invention, there is provided a method of controlling a vehicle telematics unit using a mobile device. The method includes the steps of: determining a mobile device is configured to control a vehicle telematics unit; receiving at a call center a vehicle telematics unit (VTU) command from the mobile device instructing the telematics unit to provide vehicle data using short range wireless communication (SRWC); sending the VTU command from the call center to the telematics unit; and transmitting via SRWC the vehicle data.

According to another embodiment of the invention, there is provided a non-transitory computer-readable medium that includes instructions executable by a mobile device, wherein the instructions include generating a vehicle telematics unit (VTU) command to instruct a telematics unit to broadcast vehicle data via short range wireless communication (SRWC).

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The methods described below pertain to using a mobile device to control or command at least some aspects of a vehicle telematics unit. One aspect of the telematics unit may be its capability of hosting a wireless local area network (WLAN) for devices, such as the mobile device, and thereby allowing short range wireless communication (SRWC) therewith (e.g., the telematics unit acting as a wireless hotspot (e.g., a Wi-Fi hotspot). In some embodiments, the mobile device may control what the telematics unit broadcasts via SRWC. And in one specific implementation, the mobile device may command the telematics unit to broadcast its credential data—e.g., security data associated with the WLAN that includes the network name (e.g., the SSID) and/or the network password. This may enable a vehicle user to change the network name and/or password without interaction by a call center advisor. Some newer telematics units may be coupled to a vehicle head unit that enables the user to change the network name and password without such advisor interaction. However, older telematics systems may not have such capability and some vehicle users may find it desirable to make such changes using the mobile device.

The system and the various methods carried out by the system are described below in greater detail. In addition, the operating environment is described below.

Communications System—

Figure 1:
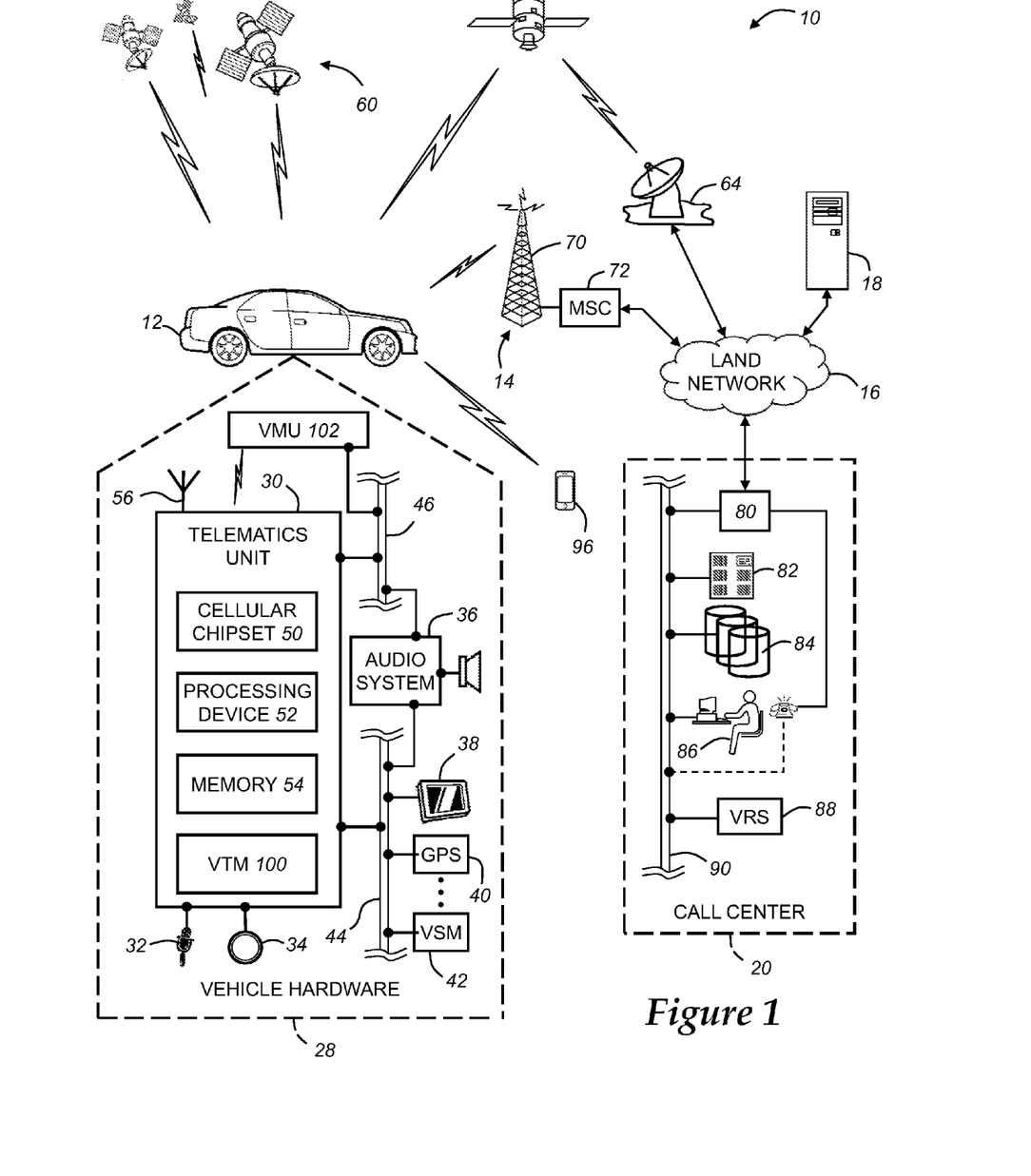
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It will be appreciated that GSM or CDMA standards illustrate merely exemplary implementations and other standards are also possible (e.g., LTE). It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices (including a mobile device 96) can also be carried out using telematics unit 30. For this purpose, telematics unit 30 can be configured to communicate wirelessly according to one or more suitable wireless protocols (e.g., WiMAX, ZigBee®, etc.), including any short range wireless communication (SRWC) such as any suitable Wi-Fi standard (e.g., IEEE 802.11), Wi-Fi Direct, Bluetooth, wireless infrared transmission, or various combinations thereof. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

In some embodiments, a vehicle task manager (VTM) 100 may be coupled to or, as shown, a sub-component of the telematics unit 30. The VTM may be a configurable component that makes various vehicle information available to the telematics unit 30 (e.g., among other things, it may monitor, receive, and prioritizes vehicle tasks). The VTM 100 may be composed of hardware, software, firmware, or any combination thereof.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

As discussed above, in some implementations, the telematics unit may communicate with a vehicle head unit or vehicle multi-tainment unit (VMU).

Some vehicle implementations may include a communication device such as a vehicle head unit or vehicle multi-tainment unit (VMU) 102 which may include some of the vehicle electronics previously discussed (e.g., the audio system 36, the visual display 38, etc.). As used herein, the VMU 102 may include all suitable electronics, software, etc. for providing vehicle entertainment and vehicle infotainment services to the vehicle users and/or occupants. In some instances, the VMU 102 is electronically coupled to (and in communication with) the telematics unit 30 (e.g., via bus 46). The unit 102 may be modular or may be embedded within the vehicle 12. In addition, the VMU 102 may be integrated (e.g., a fixture) within the vehicle or in some circumstances may be detachably fixed or detachably tethered. Furthermore, the VMU 102 may have a SRWC antenna and suitable electronic SRWC circuitry enabling SRWC with the telematics unit 30 (e.g., Bluetooth, Wi-Fi, Wi-Fi Direct, just to name a few examples). Thus, the VMU may receive telematics services data via the telematics unit 30 and provide this data to a vehicle user. Examples of VMUs include interactive displays in the vehicle instrument panel, interactive displays embedded within the backing of vehicle seating or the vehicle headliner, and other interactive vehicle devices/displays that are portable.

In at least one implementation of the methods described below, the VMU 102 (i.e., the telematics service-equipped VMU) is not within the vehicle 12. Thus, for example, a mobile device may provide telematics services instead, as will be described in greater detail below.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

The operating environment may further include one or more handheld communications devices (HCDs) or mobile devices 96. The mobile device may be an electronic device which may be used to make mobile telephone calls across a wide geographic area where transmissions are facilitated by the wireless carrier system 14 (i.e., when the mobile device is connected to the wireless carrier system).

The mobile device may further include: hardware, software, and/or firmware enabling cellular telecommunications and communications via short-range wireless communication (e.g., Wi-Fi Direct and Bluetooth) as well as other mobile device applications. The hardware of the mobile device 96 may comprise: a processor and memory (e.g., non-transitory computer readable medium configured to operate with the processor) for storing the software, firmware, etc. The mobile device processor and memory may enable various software applications, which may be preinstalled or installed by the user (or manufacturer) (e.g., having a software application or graphical user interface or GUI). One commercial implementation of a vehicle-mobile device application may be RemoteLink™, enabling a vehicle user to communicate with the vehicle 12 and/or control various aspects or functions of the vehicle—e.g., among other things, allowing the user to remotely lock/unlock vehicle doors, turn the vehicle On/Off, check the vehicle tire pressures, fuel level, oil life, etc. RemoteLink™ may also allow the user to connect with the call center 20 or the call center advisor 86 at any time.

The mobile device hardware also may include a display, a keypad (e.g., push button and/or touch screen), a microphone, one or more speakers, motion-detection sensors (such as accelerometers, gyroscopes, etc.), and a camera.

In addition to the aforementioned features, modern mobile devices may support additional services and/or functionality such as short messaging service (SMS or texts), multimedia messaging service (MMS), email, internet access, as well as business and gaming applications.

Non-limiting examples of the mobile device 96 include a cellular telephone, a personal digital assistant (PDA), a Smart Phone, a personal laptop computer or tablet computer having two-way communication capabilities, a netbook computer, or any suitable combinations thereof. The mobile device 96 may be used inside or outside of a mobile vehicle (such as the vehicle 12 shown in FIG. 1), and may be coupled to the vehicle by wire or wirelessly (e.g., using short range wireless communication). The mobile device also may be configured to provide services according to a subscription agreement with a third-party facility or wireless/telephone service provider. It should be appreciated that various service providers may utilize the wireless carrier system and that the service provider of the telematics unit 30 may not necessarily be the same as the service provider of the mobile devices 96.

The mobile device 96 and the vehicle 12 may be used together by a person known as the vehicle user such as the driver. However, the vehicle user does not need to be the driver of the vehicle 12 nor does the vehicle user need to have ownership of the mobile device 96 or the vehicle 12 (e.g., the vehicle user may be an owner or a licensee of either or both).

Method—

Figure 2:
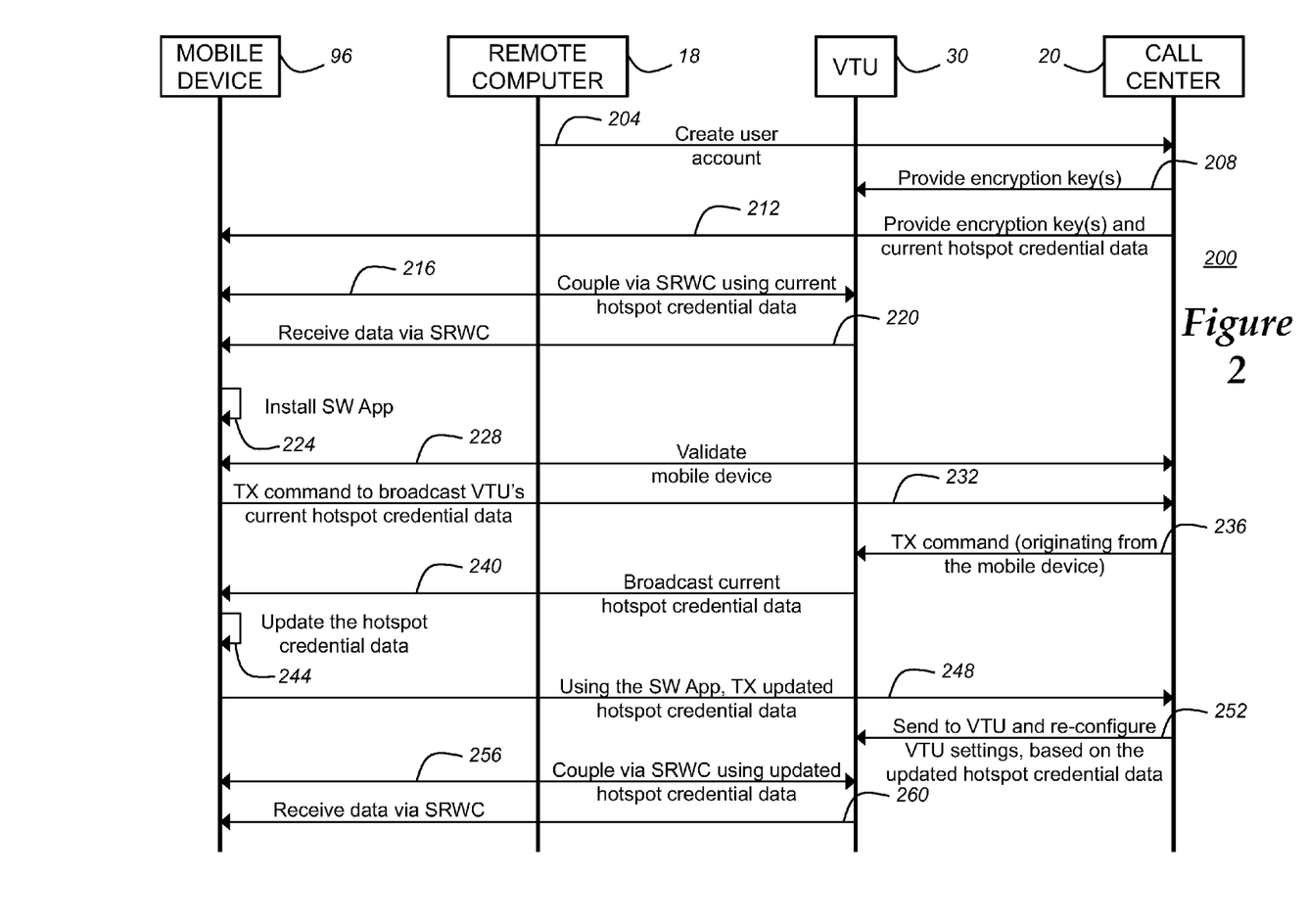
FIG. 2 is one method of controlling a vehicle telematics unit using a mobile device.

Turning now to FIG. 2, there is shown a method 200 of using the mobile device 96 to control the vehicle telematics unit (VTU) 30 and reconfigure the credential settings of the telematics unit.

The method 200 may begin with step 204 where the user of the mobile device 96 and the vehicle 12 creates a user account. The user may perform this step using a variety of devices such as a remote computer 18 (or even the mobile device 96). The user account may be stored and accessible on a computer server or remote server located at the call center 20 (e.g., at the call center backend).

The user account may include validating data to verify and/or validate that future login attempts are secure; e.g., granting access only to the user. The validating data may include an account username and account password. In addition, the user account may store a variety of telematics unit parameters and/or user preferences.

In step 208, the call center 20 may provide the telematics unit 30 with at least one encryption key. For example, a first key may be provided for secure cellular transmission between the telematics unit and the call center (e.g., using the land communications network 16 and one or more wireless carrier systems 14); and a second key may be provided for user with secure short range wireless communication (SRWC) within the vehicle. The telematics unit 30 may store both. In one embodiment, both first and second keys are unique and part of a private key infrastructure. Thus, for example, the call center also shares the first key, and any mobile device with access to the telematics unit 30 via SRWC also shares the second key. Step 208 may occur before or after step 204.

In step 212, the call center may provide the mobile device 96 with at least one encryption key. For example, the call center may provide the second key to the mobile device to enable SRWC with the telematics unit. In addition, the call center 20 may provide the mobile device with a third key to allow for secure cellular communication between it and the mobile device 96. The mobile device may store both. These keys may or may not be part of the previously described private key infrastructure. Furthermore, the keys provided by the call center in steps 208 and 212 may be provided in a variety of ways which will be appreciated by skilled artisans.

In step 212, the call center 20 also may provide the current vehicle hotspot credential data to the mobile device 96 (i.e., the access credential data). Credential data may include a wireless local area network (WLAN) name or set service identifier (SSID), a WLAN password, an associated internet protocol (IP) address, associated mask data, associated gateway data, an associated media access (MAC) address of the telematics unit or other associated SRWC hardware coupled to or within the telematics unit, etc. These are just a few examples; other examples of credential data also may be possible. In at least one implementation, the third shared key is provided first to the mobile device so that the credential data may be later sent to the mobile device securely. This may be provided using a call center advisor 86; in addition, the mobile device 96 may provide a unique identifier (e.g., a serial number, MAC address, etc.) to the call center 20 to be used later in the method below. And step 212 may occur before or after steps 204 and/or 208.

In step 216, the mobile device 96 and the telematics unit 30 may pair or otherwise wirelessly couple; e.g., this pairing may be secure using the shared, second keys. In step 216, the mobile device may be granted access to the WLAN by providing the current vehicle hotspot credential data to the telematics unit. And in at least one example, the mobile device 96 provides at least the WLAN password after identifying the WLAN by name.

In step 220, the mobile device 96 and telematics unit 30 may communicate via SRWC. For example, the mobile device may receive infotainment information, entertainment information, etc. using the hotspot functionality of the telematics unit.

The mobile device 96 may receive a software (SW) application associated with the vehicle 12 and user account. For example, the user of the mobile device may visit an online software application store or web-service and download the SW app therefrom. And in step 224, the mobile device 96 may install this SW application onto memory of the mobile device. This step may be performed earlier as well.

In step 228, the mobile device with the installed SW app may be validated by the call center 20. For example, having downloaded the SW app, the user of the mobile device may provide the same account username and account password into the SW app on the mobile device that was provided to the call center backend (see step 204). In order to validate the mobile device, the mobile device may convey this information cellularly to the call center 20. In some instances, this transmission is performed securely using the third key. The call center 20 may receive the account username and account password and verify that the password is associated with the username; further, the call center also may confirm that the mobile device 96 is associated with the user's account; e.g., the mobile device may provide a unique identifier to the call center 20, and this identifier may be compared to the previously provided unique identifier (in step 212). In at least one embodiment of step 228, the call center may provide an indication of acknowledgement and validation to the mobile device.

Having validated the mobile device, the mobile device 96 may access the backend account and configure at least one telematics unit parameter (e.g., a software setting) granting mobile device control of the telematics unit 30 (e.g., enabling remote commands). Alternatively, the backend account may be accessed via computer 18. Then, in step 232, the mobile device may transmit a VTU request or command cellularly to the telematics unit 30. In step 232, the transmission routes first to the call center 20.

In step 236, the call center 20 transmits or retransmits the VTU command to the telematics unit 30—e.g., also via cellular communication.

In step 240, the telematics unit 30 receives the VTU command and performs it. In at least one implementation, the VTU command may be commanding the telematics unit to broadcast or provide via SRWC its current hotspot credential data.

The mobile device 96 may receive the current hotspot credential data and, in step 244, update, change, or otherwise alter this data. For example, the user may determine that a new WLAN name and/or new WLAN password is desirable. This may occur, e.g., when the user wishes to inhibit another user (having the current hotspot credential data) from using the hotspot functionality of the telematics unit 30. Thus, in step 244, the user may create a new WLAN name and/or WLAN password.

In step 248, the mobile device 96 may transmit cellularly the new or updated hotspot credential data to the call center 20.

And in step 252, the call center 20 may transmit cellularly the updated hotspot credential data to the telematics unit 30. In at least one implementation, the call center transmits a command using a voice or data communication instructing and/or reconfiguring the credential data of the telematics unit—i.e., replacing the previous credential data with and/or adding the updated hotspot credential data to telematics unit memory 54.

In step 256, the mobile device 96 and telematics unit 30 may pair or re-pair. This step may be similar to that described in step 216; however, here the mobile device may use the updated hotspot credential data which matches that of the reconfigured telematics unit 30.

And in step 260, the mobile device 96 may receive data—similar to that described with respect to step 220.

Figure 3:
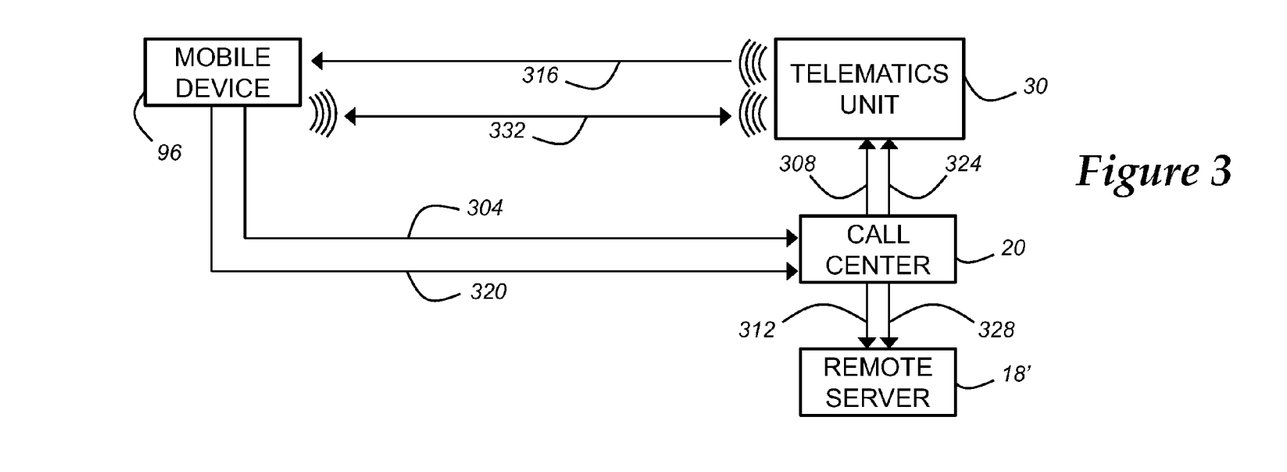
FIG. 3 is a communication flow diagram illustrating a method of controlling the vehicle telematics unit using the mobile device.

FIG. 3 further illustrates a portion of the method 200 shown in FIG. 2. More specifically, FIG. 3 illustrates the communication paths between the mobile device 96, the telematics unit 30, the call center 20, and a remote server 18'. The remote server 18' may be a database or server located at or remote from the call center 20. In some implementations, the server 18' stores the user account previously described, allowing remote access thereto.

In FIG. 3, step 304, the mobile device 96 sends the VTU command to the call center requesting vehicle data to be provided or broadcast by the telematics unit 30 (and e.g., in at least one implementation, the vehicle data is the current hotspot credential data).

The call center may receive this VTU command and in step 308, may transmit it to the telematics unit 30 using cellular communication.

In step 312, the call center may also send the content of the VTU command to the remote server 18; e.g., to record the command at the user's account.

In step 316, the telematics unit 30 provides or broadcasts the current vehicle credential data via SRWC, and this data may be received by the mobile device 96.

In step 320, the mobile device 96 may send updated hotspot credential data to the call center 20 using cellular communication—e.g., the updated hotspot credential data may include the current (or old) WLAN password broadcasted by the telematics unit and/or a new WLAN password—chosen by the user. It may also include a new (and/or the old) WLAN name.

In step 324, the updated hotspot credential data may be sent from the call center 20 to the telematics unit using cellular communication.

In step 328, this updated hotspot credential data also may be sent from the call center 20 to the remote computer 18' and there recorded, as previously described (e.g., see step 312).

In step 332, the mobile device 96 and telematics unit 30 may pair and/or communicate via SRWC using the updated hotspot credential data. For example, after pairing, the mobile device may receive infotainment and/or entertainment data via SRWC.

In addition, it should be appreciated that other mobile devices also may communicate via SRWC with the telematics unit 30, provided the other mobile devices can provide the updated hotspot credential data to the telematics unit 30 via SRWC.

Figure 4:
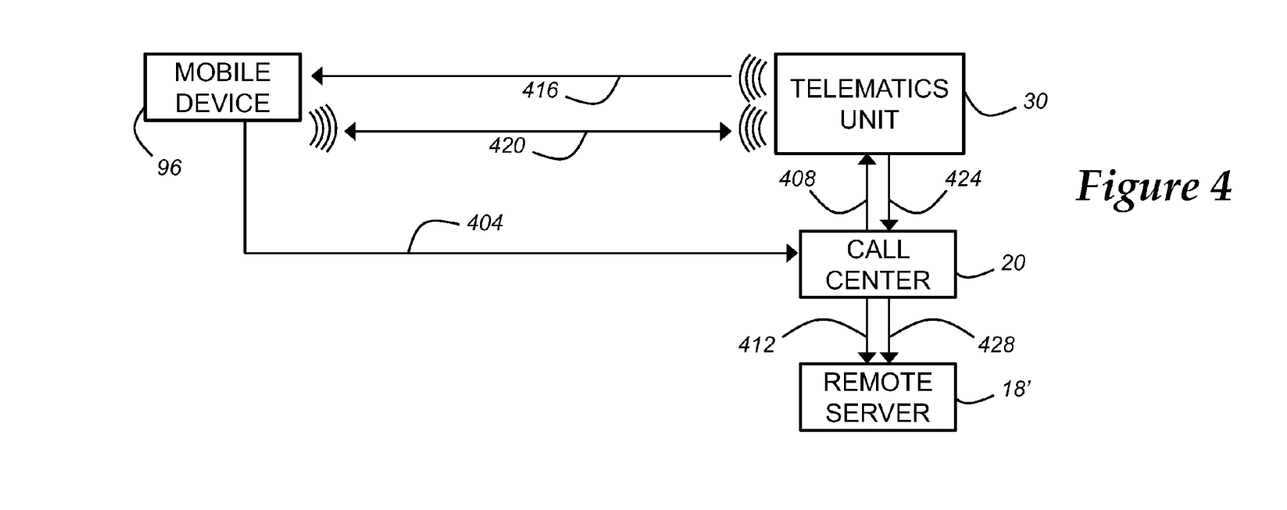
FIG. 4 is another communication flow diagram illustrating a method of controlling the vehicle telematics unit using the mobile device.

Turning now to FIG. 4, FIG. 4 illustrates an alternative embodiment of the communication paths described in FIG. 3—i.e., between the mobile device 96, the telematics unit 30, the call center 20, and a remote server 18'. Some of the steps of method 400 may be the same as or similar to some of the steps of method 300. For example, in at least one implementation, steps 404, 408, 412, and 416 may be the same as steps 304, 308, 312, and 316, respectively. Therefore, the description of these steps will not be repeated here.

After the mobile device 96 has received the vehicle data (e.g., the current hotspot credential data) via the telematics unit broadcast in step 416, in step 420, the mobile device 96 may pair and/or communicate with the telematics unit 30 via SRWC. This communication may include providing updated hotspot credential data to the telematics unit 30. Thus, the telematics unit may replace its current hotspot credential data with the updated hotspot credential data. After the credential data of the telematics unit 30 is reconfigured, the mobile device and telematics unit may pair and communicate (e.g., the mobile device may receive infotainment and/or entertainment data via SRWC).

In at least some implementations, in step 424, the telematics unit 30 may transmit the updated hotspot credential data to the call center 20. And the call center may store this information.

And/or in some instances, the call center may send this updated hotspot credential data to the remote server 18' to thereby update the user account. Of course, in some instances, the remote server 18' is located at the call center 20.

Other embodiments also exist. For example, the VTU command sent from the mobile device may be for the vehicle telematics unit to provide other vehicle data. Other vehicle data may include current vehicle tire pressures, gas mileage efficiency, engine oil life, etc., just to name a few examples. Thus, the call center 20 may receive the VTU command and transmit it to the telematics unit 30 via cellular communication. Upon receipt, the telematics unit may provide the other vehicle data via SRWC (e.g., to the mobile device 96).

Any of the implementations described herein may utilize the vehicle task manager (VTM) 100. For example, any VTU command sent from the mobile device 96, to the call center 20, and then to the telematics unit 30, may be directed first to the VTM. The VTM 100 may configure a vehicle task based on the VTU command. For example, if the current tire pressure is unknown, the VTM may set the task to determine each of the vehicle tire pressures. Once this task is complete, the VTM 100 may provide this vehicle data to the telematics unit 30; thereafter, the telematics unit may broadcast the vehicle tire pressures (the vehicle data) via SRWC, where it may be received by the mobile device 96.

Thus, there has been described various methods using a mobile device to command a vehicle telematics unit. The mobile device may have a software application that enables a VTU command to be sent to a call center and thereafter resent to the telematics unit. In one described method, the VTU command may be a command instructing the telematics unit to broadcast its credential data via SRWC. This credential data may then be received by the mobile device (via SRWC); the user of the mobile device may then update or alter the credential data and, using the software application, the updated credential data may be provided to the telematics unit and there stored.

The method(s) may be performed as one or more computer programs executable by one or more computing devices of or in communication with a vehicle telematics system to cause the system and/or the computing device(s) to perform the method, and the various method related data may be stored in any suitable memory. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer usable or readable medium, which include one or more storage devices or articles. Exemplary computer usable storage devices include conventional computer system RAM (random access memory), ROM (read only memory), EPROM (erasable, programmable ROM), EEPROM (electrically erasable, programmable ROM), and magnetic or optical disks or tapes. It is therefore to be understood that the methods may be at least partially performed by any electronic device(s) capable of executing the above-described functions.

In one embodiment, the performed method(s) include computer programs executable using the mobile device processor and memory (including mobile device software stored thereon), the telematics unit processor and memory (including telematics unit software stored thereon), and/or the call center processor and memory (including backend software stored thereon).

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of controlling a vehicle telematics unit using a mobile device, comprising the steps of:
   (a) determining that a mobile device is configured to control a vehicle telematics unit;
   (b) receiving at a call center a vehicle telematics unit (VTU) command from the mobile device instructing the vehicle telematics unit to provide vehicle data, including current vehicle hotspot credential data used by the vehicle telematics unit, to the mobile device using short range wireless communication (SRWC);

(c) sending the VTU command from the call center to the vehicle telematics unit along with one or more encryption keys;

(d) sending the one or more encryption keys from the call center to the mobile device;

(e) transmitting the vehicle data via SRWC between the vehicle telematics unit and the mobile device, wherein at least some of the vehicle data is encrypted using the encryption keys provided to the VTU and the mobile device;

(f) receiving from the mobile device updated vehicle hotspot credential data that is provided by a user; and (g) changing the current vehicle hotspot credential data of the vehicle telematics unit using the updated vehicle hotspot credential data.

2. The method of claim 1, wherein step (a) further comprises:

(a1) providing to a user of the vehicle a user account at a remote server, the user account having validating data associated therewith;

(a2) providing to the user an application software for installation on the mobile device; and (a3) validating that the mobile device is associated with the user account after receiving the validating data from the mobile device.

3. The method of claim 2, wherein validating data includes a username and password.

4. The method of claim 2, further comprising (a4): receiving an instruction via the user account enabling remote commands from the mobile device, wherein the instruction is received via a remote computer or the mobile device.

5. The method of claim 1, wherein the current vehicle hotspot credential data includes a wireless local area network (WLAN) password.

6. The method of claim 5, wherein the current vehicle hotspot credential data includes at least one of a WLAN name, an internet protocol (IP) address, mask data, gateway data, and a media access control (MAC) address.

7. The method of claim 1, wherein data communicated via SRWC between the mobile device and the vehicle telematics unit is encrypted according to a private key infrastructure.

8. The method of claim 1, wherein data communicated via cellular transmission either between the mobile device and the call center or between the vehicle telematics unit and the call center is encrypted.

9. The method of claim 1, wherein a vehicle carrying the vehicle telematics unit does not include a vehicle multi-tainment unit (VMU) capable of receiving telematics services via the vehicle telematics unit.

10. The method of claim 1, wherein the updated vehicle hotspot credential data is received and stored at a remote server in the user account.

11. The method of claim 1, wherein the updated vehicle hotspot credential data is received at the vehicle telematics unit from the call center.

12. A non-transitory computer-readable medium, comprising:

instructions executable by a mobile device, wherein the instructions include:

generating a vehicle telematics unit (VTU) command, wherein the VTU command includes instructing a vehicle telematics unit to broadcast vehicle data, including current vehicle hotspot credential data used by the vehicle telematics unit, via short range wireless communication (SRWC);

providing the VTU command to the vehicle telematics unit, wherein the instructions include sending the VTU command first to a remote facility which will then send the VTU command to the vehicle telematics unit;

receiving one or more encryption keys at the mobile device;

receiving at the mobile device updated vehicle hotspot credential data that is provided by a user; and directing the VTU to change the current vehicle hotspot credential data based on the user-provided updated vehicle hotspot credential data using a command transmitted to the VTU and encrypted using the encryption key(s).

13. The computer-readable medium of claim 12, wherein the instructions further include: enabling receipt of user-selectable credential data at the mobile device, wherein the credential data is associated with a wireless hotspot functionality of the vehicle telematics unit.

14. A method of controlling a vehicle telematics unit using a mobile device, comprising the steps of:

(a) transmitting a request for current vehicle hotspot credential data used by a vehicle telematics unit from a mobile device to a call center;

(b) receiving from the call center the current vehicle hotspot credential data at the mobile device;

(c) receiving one or more encryption keys at the mobile device;

(d) wirelessly transmitting the current vehicle hotspot credential data from the mobile device to the vehicle telematics unit via short range wireless communication (SWRC) using the encryption key(s);

(e) accessing a wireless hotspot generated by the vehicle telematics unit when the current vehicle hotspot credential data received at the mobile device matches the current hotspot credential data used by the vehicle telematics unit;

(f) receiving at the mobile device from a user updated vehicle hotspot credential data; and (g) directing the vehicle telematics unit to change the current vehicle hotspot credential data based on the user-provided updated vehicle hotspot credential data.

* * * * *